(12) United States Patent
Nakayama et al.

(10) Patent No.: US 10,388,941 B2
(45) Date of Patent: Aug. 20, 2019

(54) CONNECTION MODULE

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Osamu Nakayama, Mie (JP); Seishi Kimura, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-shi, Osaka (JP)

( * ) Notice: Subject to any disclaimer, the term of this patent is extended or adjusted under 35 U.S.C. 154(b) by 278 days.

(21) Appl. No.: 15/543,143

(22) PCT Filed: Jan. 13, 2016

(86) PCT No.: PCT/JP2016/050759
§ 371 (c)(1),
(2) Date: Jul. 12, 2017

(87) PCT Pub. No.: WO2016/117419
PCT Pub. Date: Jul. 28, 2016

(65) Prior Publication Data
US 2018/0006288 A1    Jan. 4, 2018

(30) Foreign Application Priority Data
Jan. 21, 2015    (JP) .................................. 2015-009270

(51) Int. Cl.
*H01M 2/34*    (2006.01)
*H01M 2/20*    (2006.01)
(Continued)

(52) U.S. Cl.
CPC ........... *H01M 2/348* (2013.01); *H01M 2/206* (2013.01); *H01M 10/0525* (2013.01);
(Continued)

(58) Field of Classification Search
None
See application file for complete search history.

(56) References Cited

U.S. PATENT DOCUMENTS

2012/0009447 A1    1/2012  Ikeda
2014/0233606 A1*   8/2014  Nishida .................... G01K 1/14
                                                    374/208
(Continued)

FOREIGN PATENT DOCUMENTS

JP    2009043637 A    2/2009
JP    2014127229 A    7/2014
(Continued)

OTHER PUBLICATIONS

International Search Report for Application No. PCT/JP2016/050759 dated Apr. 12, 2016, 6 pages.
(Continued)

*Primary Examiner* — Christopher P Domone
(74) *Attorney, Agent, or Firm* — Reising Ethington, P.C.

(57) ABSTRACT

A connection module configured to connect a plurality of battery packs having positive and negative electrode terminals, the connection module including an insulating member having a holding portion that holds a bus bar configured to connect electrode terminals of adjacent battery packs, and a temperature detection portion that detects the temperature of the bus bar, the insulating member having a temporary locking portion that detachably locks the temperature detection portion.

4 Claims, 9 Drawing Sheets

(51) Int. Cl.
*H01M 10/0525* (2010.01)
*H01M 10/48* (2006.01)
(52) U.S. Cl.
CPC ........ *H01M 10/486* (2013.01); *H01M 10/482* (2013.01); *H01M 2200/10* (2013.01); *H01M 2220/20* (2013.01)

(56) References Cited

U.S. PATENT DOCUMENTS

| | | | |
|---|---|---|---|
| 2015/0010808 A1* | 1/2015 | Shoji | H01M 2/206 429/158 |
| 2016/0021772 A1 | 1/2016 | Nakayama | |
| 2016/0028194 A1 | 1/2016 | Nakayama | |
| 2016/0126601 A1* | 5/2016 | Ichikawa | H01M 10/486 374/152 |
| 2016/0197330 A1 | 7/2016 | Takase | |

FOREIGN PATENT DOCUMENTS

| | | | |
|---|---|---|---|
| JP | 2014191953 A | 10/2014 |
| JP | 2014191954 A | 10/2014 |
| JP | 2015015091 A | 1/2015 |

OTHER PUBLICATIONS

International Preliminary Search Report on Patentability for Application No. PCT/JP2016/050759, 7 pages.

* cited by examiner

CONNECTION MODULE

CROSS REFERENCE TO RELATED APPLICATIONS

This application claims the priority of Japanese patent application JP2015-009270 filed on Jan. 21, 2015, the entire contents of which are incorporated herein.

TECHNICAL FIELD

The present invention relates to a connection module.

BACKGROUND ART

Conventionally, a connection module is known that connects a plurality of electric storage elements having positive and negative electrode terminals (for example, see Patent Document 1, JP2014-191953A). A wiring module (connection module) described in Patent Document 1 includes an insulating protector (insulating member) that holds a connection member (conductor), and after the insulating protector holding the connection member is placed on the plurality of electric storage elements, the plurality of electric storage elements are connected by connecting the electrode terminals of adjacent electric storage elements with the connection member.

Incidentally, when an electric storage element is used in a high temperature state, its lifetime may be short. Also, when a lithium ion battery is used as the electric storage element, there is a risk that the battery will become hot when charging. In order to avoid such a situation, the wiring module described in Patent Document 1 is provided with a temperature detection portion that detects the temperature of the connection member.

Specifically, in the wiring module described in Patent Document 1, the temperature detection portion is disposed on the connection member being held by the insulating protector, and in this state, the temperature detection portion and the connection member are fastened to the electrode terminals by a bolt, thus fixing the temperature detection portion on the connection member.

In this regard, in a case where the temperature of the connection member is detected with the temperature detection portion, it is also possible to dispose the temperature detection portion between the connection member and the electrode terminals. However, in such a case, the electrical resistance between the connection member and the electrode terminals increases due to the presence of the temperature detection portion. When the temperature detection portion is fixed on the connecting member as in the wiring module described in Patent Document 1, such an increase in electrical resistance can be suppressed.

SUMMARY

Incidentally, in some cases the connection module and the conductor may be separately delivered to the vehicle manufacturer. In such a case, the manufacturer of the connection module cannot fix the temperature detection portion to the conductor in advance. Further, in this case, it is also impossible to fix the temperature detection portion to the insulating member in advance. The reason for this is that if the temperature detection portion is fixed to the insulating member, the temperature detection portion cannot be disposed on the conductor being held by the insulating member.

Therefore, in this case, the connection module is delivered to the vehicle manufacturer in a state in which the temperature detection portion is not fixed to the conductor or the insulating member, and the work of fixing the temperature detection portion on the conductor is performed by a worker of the vehicle manufacturer. For this reason, it is desirable that a worker of the vehicle manufacturer can efficiently perform that work.

The present specification discloses a technique whereby it is possible to efficiently perform work of fixing a temperature detection portion on a conductor.

A connection module disclosed according to the present specification is a connection module configured to connect a plurality of electric storage elements having positive and negative electrode terminals, the connection module including: an insulating member having a holding portion that holds a conductor configured to connect the electrode terminals of adjacent electric storage elements; and a temperature detection portion that detects the temperature of the conductor; the insulating member having a temporary locking portion that detachably locks the temperature detection portion.

In a case where the connection module is delivered in a state in which the temperature detection portion is not fixed to the conductor or the insulating member, when a worker at the delivery destination performs work of fixing the temperature detection portion on the conductor being held by the holding portion, if the temperature detection portion is at a position distant from the insulating member, the distance of hand motion becomes long, and therefore work efficiency is reduced. According to the above connection module, if the manufacturer of the connection module delivers the connection module in a state with the temperature detection portion locked to the temporary locking portion, since the temperature detection portion is near the insulating member, a worker at the delivery destination can efficiently perform that work.

Also, the temporary locking portion may detachably lock the temperature detection portion at a position where the temperature detection portion does not interfere with the conductor when the conductor is held by the holding portion.

According to the above connection module, when the worker causes the holding portion to hold the conductor, the locked temperature detection portion does not interfere with the conductor, so in comparison to a case where the temperature detection portion is locked at a position that interferes with the conductor, it is possible to more efficiently perform the work of causing the holding portion to hold the conductor.

Also, a configuration may be adopted in which the temperature detection portion has a rotary shaft, and when the temperature detection portion locked to the temporary locking portion rotates around the rotary shaft, locking is released, and when the temperature detection portion with locking released further rotates around the rotary shaft, the temperature detection portion abuts against the conductor.

According to the above connection module, by hand movement in one direction that rotates the temperature detection portion around the rotary shaft, the worker can perform work to release the temperature detection portion from the locking portion and work to place the temperature detection portion on the conductor. Therefore, it is possible to more efficiently perform the two forms of work than in a case where the worker must move their hand in two or more directions, such as a case where the worker releases locking of the temperature detection portion by moving their hand in a certain direction, and moves the temperature detection portion released from locking in another direction to place the temperature detection portion on the conductor.

Also, a configuration may be adopted in which a groove crossing between the holding portion and the temporary locking portion is provided in the insulating member, and when the temperature detection portion is locked to the temporary locking portion, the rotary shaft is accommodated in the groove in an attitude such that an axis line of the rotary shaft extends in a longitudinal direction of the groove.

According to the above connection module, when the worker rotates the temperature detection portion, the temperature detection portion is suppressed from moving in a direction perpendicular to the axis line of the rotary shaft by the groove. In other words, the work of the worker rotating the temperature detection portion is assisted by the groove, so the work of rotating the temperature detection portion becomes easy.

Also, a configuration may be adopted in which the temperature detection portion includes a temperature detection element and a wire connected to the temperature detection element, and the groove is a groove where the wire is wired.

According to the above connection module, the groove for wiring the wire can be used also as a groove that assists rotation of the temperature detection portion, so the configuration can be simplified in comparison to a case where a groove that assists rotation of the temperature detection portion is separately provided.

Also, a connection module disclosed according to the present specification may be a connection module to be attached to an electric storage element group in which a plurality of storage elements having positive and negative electrode terminals are arranged, the connection module including: a conductor configured to electrically connect the electrode terminals of adjacent electric storage elements; an insulating member having a holding portion that holds the conductor; and a temperature detection portion that detects the temperature of the conductor; the insulating member having a temporary locking portion that detachably locks the temperature detection portion.

According to the above connection module, it is possible to efficiently perform work of fixing the temperature detection portion on the conductor.

According to the above connection module, it is possible to efficiently perform work of fixing a temperature detection portion on a conductor.

DESCRIPTION OF EMBODIMENTS

Embodiment

Figure 1:
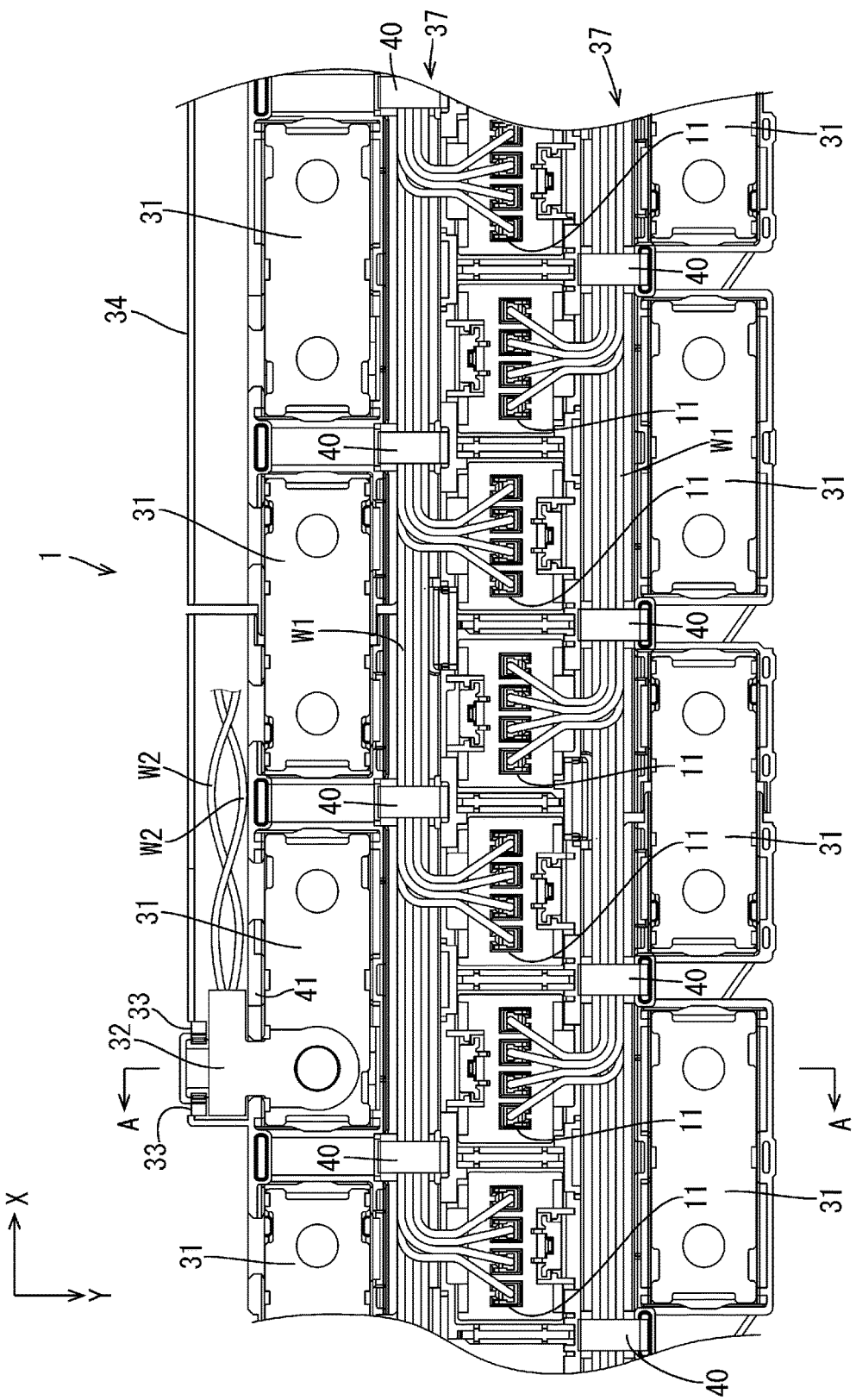
FIG. 1 is a top view of a connection module according to an embodiment (showing a state in which a temperature detection portion is fixed to electrode terminals).

An embodiment of the present design will be described with reference to FIGS. 1 to 9. In the following description, for a plurality of identical members, a reference numeral may be assigned to one member, and reference numerals omitted for the other members.

An overview of a connection module 1 according to the present embodiment will be described with reference to FIG. 1. The connection module 1 is configured to connect in series a plurality of battery packs 2 (see FIG. 3) used as a power source for driving a vehicle such as an electric automobile or a hybrid automobile. The battery packs 2 are an example of "electric storage elements".

A plurality of electric wires W1 configured to be connected to each battery pack 2 are wired in the connection module 1. As will be described in detail later, one battery pack 2 is configured with four single batteries, and the plurality of electric wires W1 are used to detect the voltages of those single batteries. After the plurality of battery packs 2 are connected by the connection module 1, the electric wires W1 are connected to the single batteries by pushing down module side connectors 11 to connect them to single battery side connectors 21 (see FIG. 3).

A plurality of bus bars 31 that electrically connect electrode terminals 22 (see FIG. 3) of adjacent battery packs 2 are held by the connection module 1. In the present embodiment, the bus bars 31 are held by the connection module 1 before the connection module 1 is placed on the plurality of battery packs 2. Then, after the connection module 1 holding the bus bars 31 is placed on the plurality of battery packs 2, the bus bars 31 are fastened to the electrode terminals of the battery packs 2 with an unshown bolt, thus electrically connecting the electrode terminals. Note that the bus bars 31 also may be held by the connection module 1 after the connection module 1 is placed on the plurality of battery packs 2. The bus bars 31 are an example of "conductors".

Also, the connection module 1 is provided with a temperature detection portion 32 that detects the temperature of the bus bars 31. The temperature detection portion 32 is disposed on the bus bars 31 being held by the connection module 1, and is configured to be fastened to the electrode terminals 22 together with the bus bars 31 by the bolt described above. That is, the temperature detection portion 32 is fixed on the bus bars 31, and detects the temperature of the electrode terminals 22 by detecting the temperature of the bus bars 31. Note that in FIG. 1, the temperature detection portion 32 is provided only in one bus bar 31, but the temperature detection portion 32 may also be provided in two or more of the bus bars 31.

Figure 2:
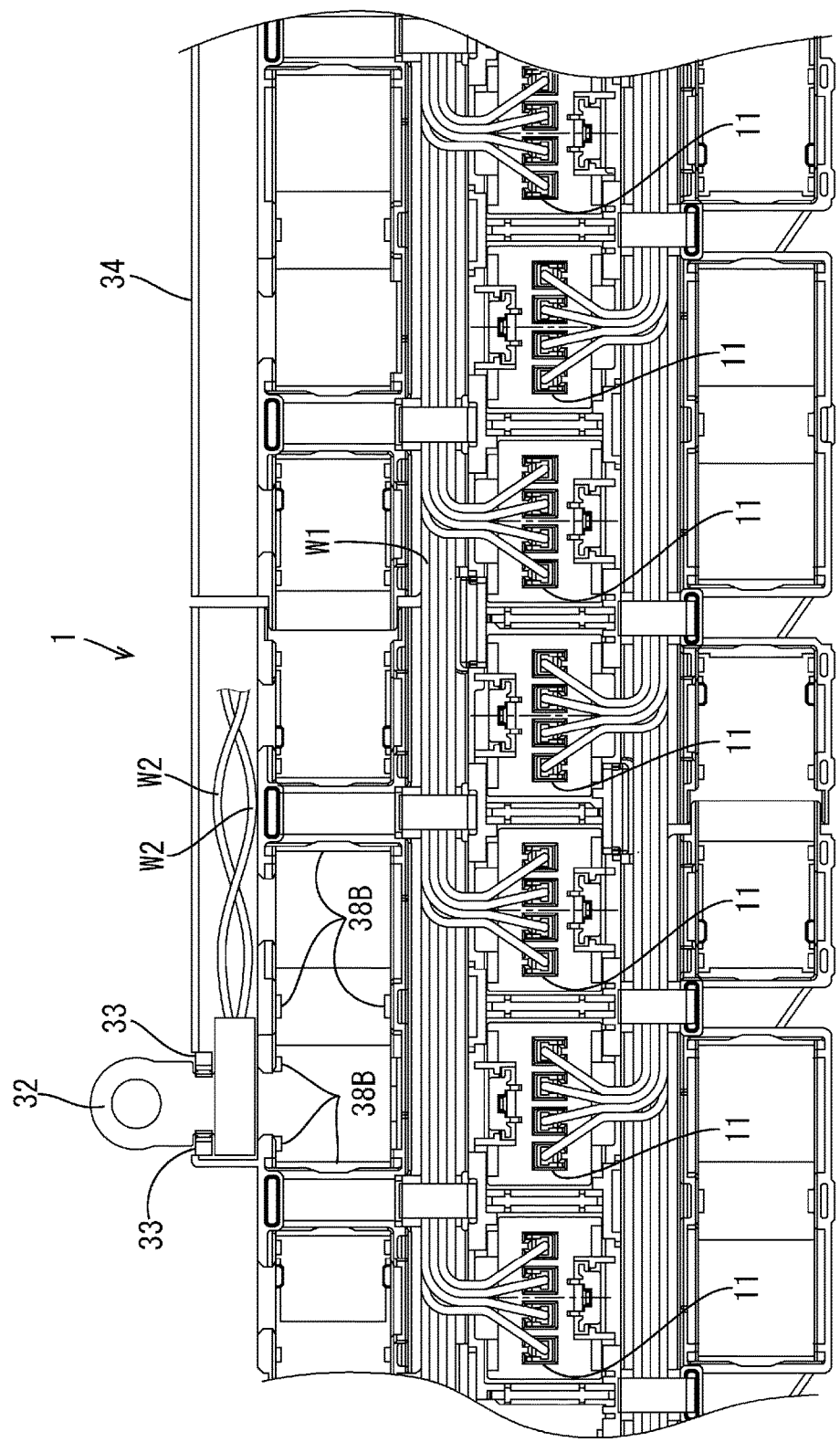
FIG. 2 is a top view of the connection module (showing a state in which the temperature detection portion is temporarily locked to a temporary locking portion).

Also, the connection module 1 has temporary locking portions 33 that lock the temperature detection portion 32, in a form such that the temperature detection portion 32 is easily detachable. In the present embodiment, the connection module 1 and the bus bars 31 are separately delivered to the vehicle manufacturer, and the work of fixing the temperature detection portion 32 on the bus bars 31 is performed by a worker of the vehicle manufacturer. For this reason, as shown in FIG. 2, the connection module 1 is delivered to the vehicle manufacturer in a state not holding the bus bars 31, and in a state in which the temperature detection portion 32 is locked to the temporary locking portions 33.

Figure 3:
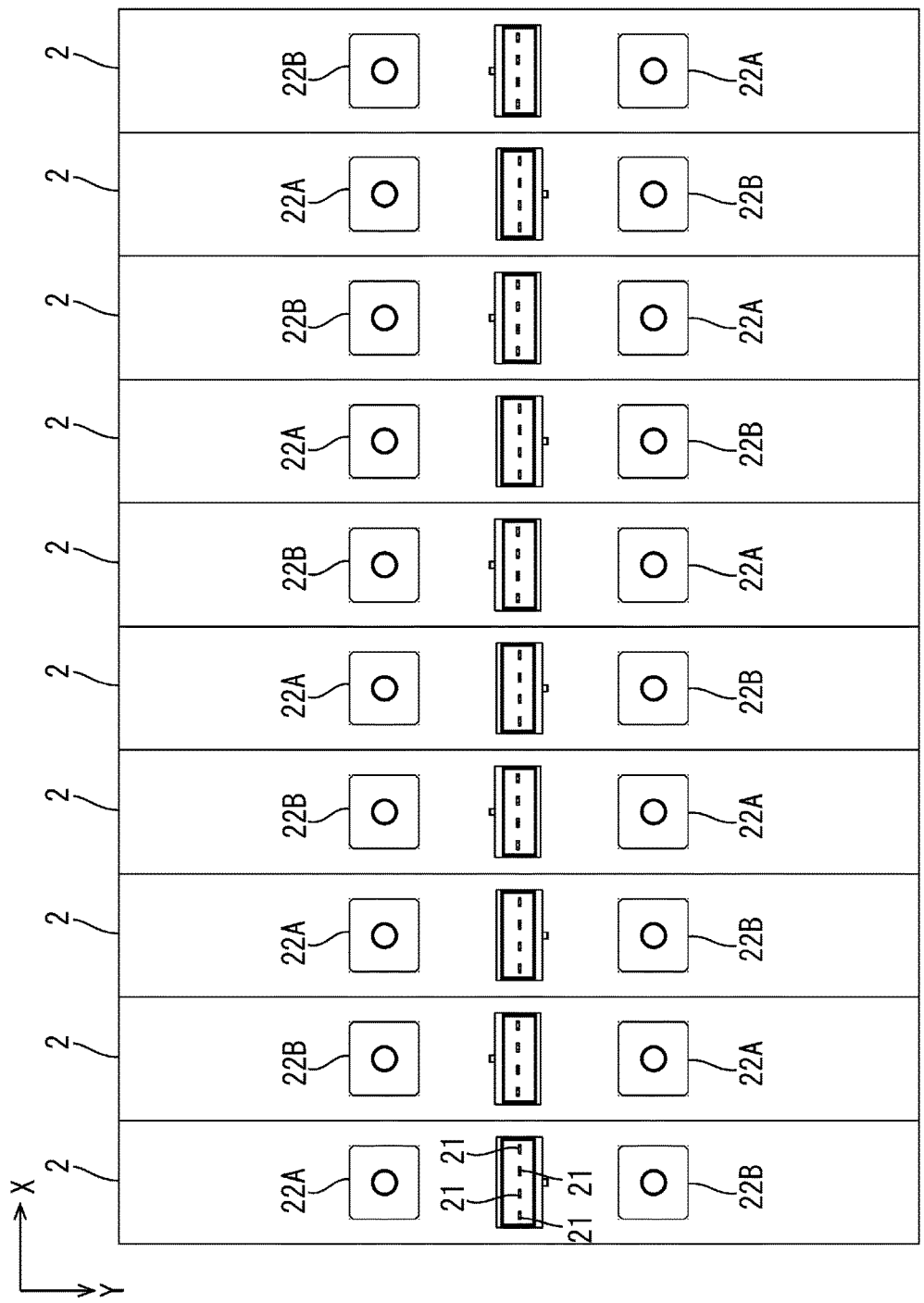
FIG. 3 is a top view of battery packs.

The battery packs 2 will be described with reference to FIGS. 3 and 4. One battery pack 2 is configured by stacking four laminate-type single batteries having a small thickness in the thickness direction (the left-right direction shown in FIG. 3). As shown in FIG. 3, a positive electrode terminal 22A and a negative electrode terminal 22B are provided on the upper face of the battery pack 2. Each of the battery packs 2 is disposed such that the electrode terminals 22A and 22B are opposite to those in respective adjacent other battery packs 2.

Figure 4:
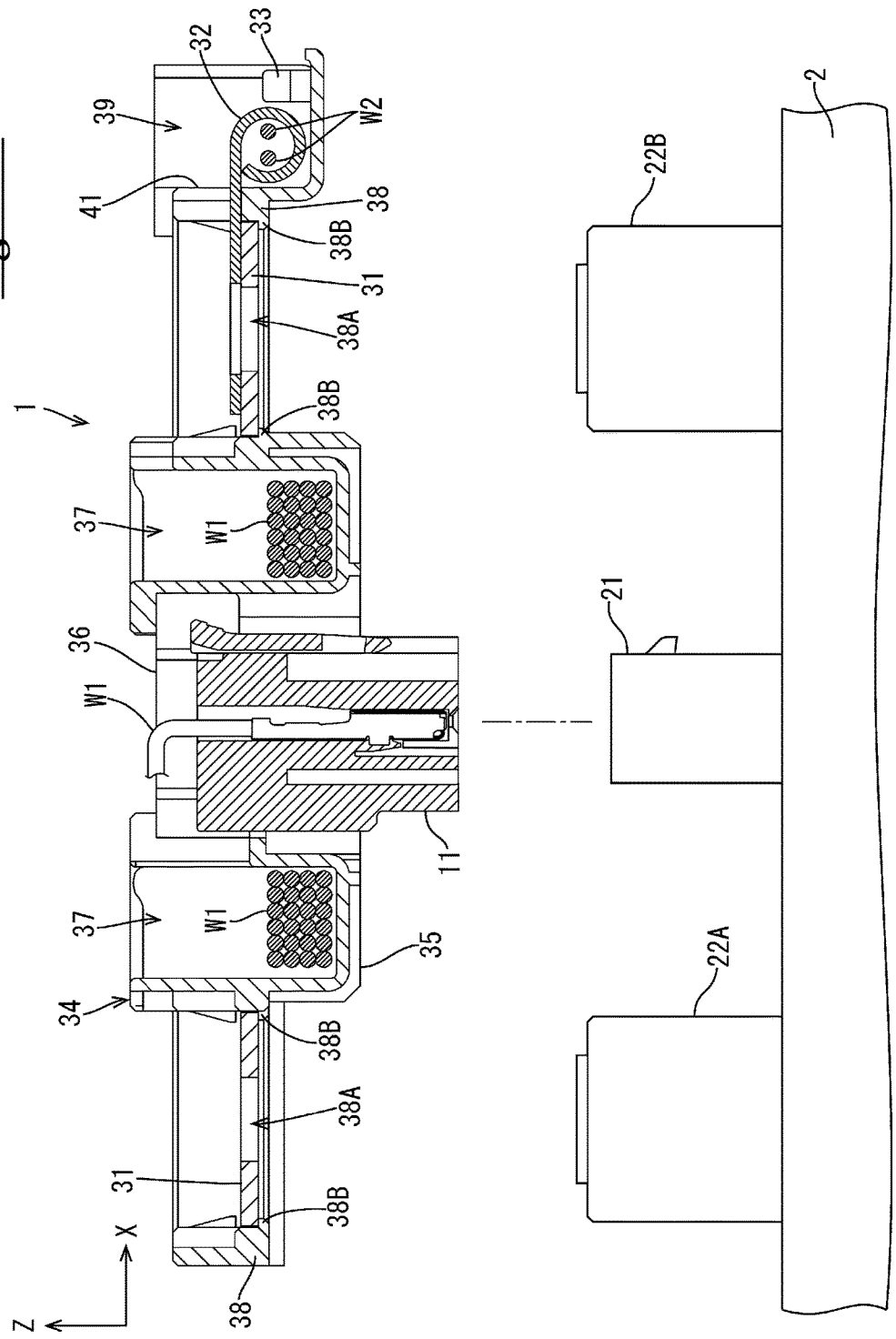
FIG. 4 is a cross-sectional view of the connection module, taken along line A-A shown in FIG. 1.

As shown in FIG. 4, the electrode terminals 22A and 22B are provided so as to protrude upward, and an unshown bolt fastening hole is formed on the upper face of the electrode terminals. Also, between the electrode terminals 22A and 22B, single battery side connectors 21 are provided so as to protrude upward. As described above, since one battery pack 2 is configured with four single batteries, four of the single battery side connectors 21 are provided in one battery pack 2.

Figure 5:
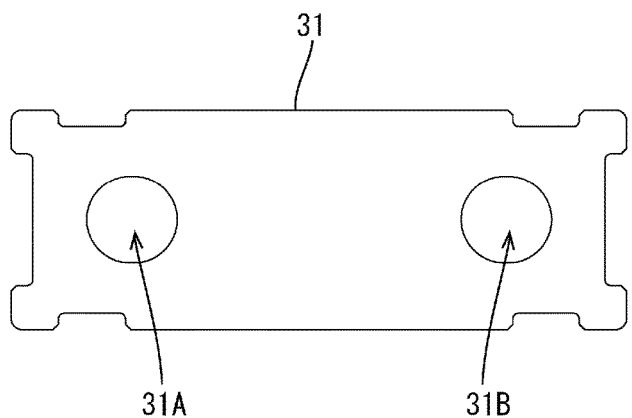
FIG. 5 is a top view of a bus bar.

A bus bar 31 will be described with reference to FIG. 5. The bus bar 31 is formed in a substantially rectangular shape by pressing a metal plate composed of copper, a copper alloy, a stainless steel (SUS), aluminum, or the like. In the bus bar 31 there are formed a pair of bolt through-holes 31A and 31B through which bolts can be inserted. Note that a metal such as tin or nickel may be plated on the surface of the bus bar 31.

As shown in FIG. 1, the connection module 1 is provided with an insulating protector 34 and the temperature detection portion 32.

Figure 6:
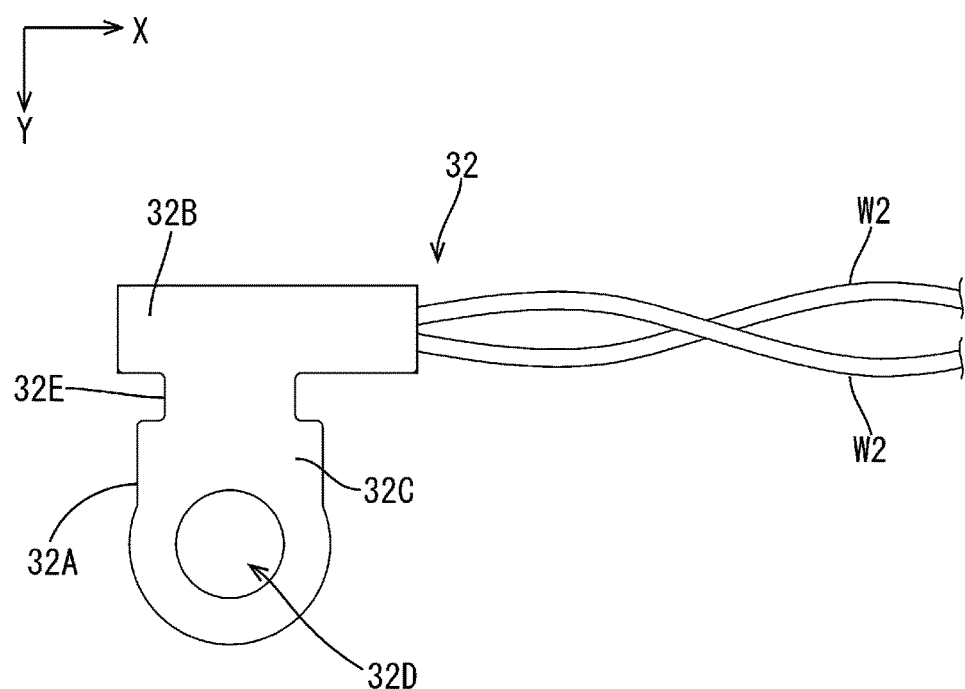
FIG. 6 is a top view of the temperature detection portion.

First, the temperature detection portion 32 will be described with reference to FIGS. 6 and 7. As shown in FIG. 6, the temperature detection portion 32 is provided with a metal member 32A, an unshown temperature detection element, and a pair of wires W2.

Figure 7:
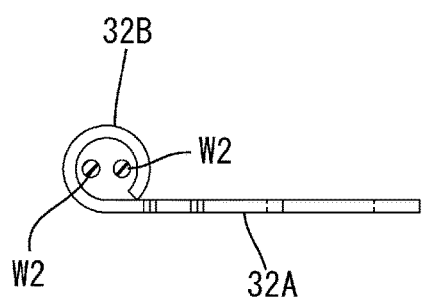
FIG. 7 is a side view of the temperature detection portion.

The metal member 32A is a metal plate made of copper, a copper alloy, a stainless steel (SUS), aluminum, or the like, and as shown in FIG. 7, a rotary shaft 32B is formed by rolling an edge portion of the metal member 32A into a cylindrical shape. As shown in FIG. 6, a bolt insertion hole 32D for inserting a bolt is formed in a flat plate portion 32C, which is a portion of the metal member 32A other than the rotary shaft 32B. Also, in the flat plate portion 32C, a narrow portion 32E having a narrow lateral width (width in the left-right direction shown in FIG. 6) is formed.

The unshown temperature detection element is provided inside the rotary shaft 32B. The temperature detection element detects the temperature of the bus bar 31 by detecting the temperature of the metal member 32A. A PTC thermistor, an NTC thermistor, or the like can be used as the temperature detection element. Note that the temperature detection element may be an arbitrary element as long as the element can detect the temperature of the metal member 32A.

The pair of wires W2 are connected to the temperature detection element and led out from the inside of the rotary shaft 32B. The temperature detected by the temperature detection element is output to an external device by the pair of wires W2.

The temperature detection element and the pair of wires W2 are fixed inside the rotary shaft 32B by insulating resin (for example, epoxy resin). Note that the method of fixing the temperature detection element and the pair of wires W2 inside the rotary shaft 32B is not limited to the method described here, and the temperature detection element and the pair of wires W2 can be fixed by an appropriate method.

Next, the insulating protector 34 will be described with reference to FIG. 4. As shown in FIG. 4, the insulating protector 34 has a main body portion 35 and a module side connector 11 attached to the main body portion 35.

The main body portion 35 is formed from an insulating material such as a synthetic resin. A connector holding portion 36, a pair of voltage wire wiring grooves 37, a pair of bus bar holding portions 38, a temperature wire wiring groove 39, and a temporary locking portion 33 are formed in the main body portion 35. The main body portion 35 is an example of an "insulating member". Also, the bus bar holding portion 38 is an example of a "holding portion".

A through-hole penetrating in the vertical direction is formed in the connector holding portion 36. The module side connector 11 is held by the connector holding portion 36 by a lower end portion of the module side connector 11 being inserted into the through-hole.

The voltage wire wiring grooves 37 are provided on both left and right sides of the connector holding portion 36. The voltage wire wiring grooves 37 are grooves for wiring the wires W1 extending from the module side connector 11 in the longitudinal direction of the main body portion 35 (the left-right direction shown in FIG. 1). As shown in FIG. 1, the wires W1 are alternately wired in the voltage wire wiring grooves 37 on both sides for each battery pack 2. Also, as shown in FIG. 1, restriction portions 40 that restrict the wires W1 from protruding from the voltage wire wiring grooves 37 are provided in the voltage wire wiring grooves 37.

As shown in FIG. 4, the bus bar holding portions 38 are provided outside each voltage wire wiring groove 37. Rectangular through-holes 38A that penetrate through in the vertical direction are formed in the bus bar holding portions 38. The inner peripheral shape of an upper side portion of the through-holes 38A substantially matches the outer circumferential shape of the bus bars 31. On the other hand, stepped portions 38B that protrude inward discretely over the entire circumference are formed in a lower side portion of the through-holes 38A (see FIG. 2). The bus bars 31 are fitted into the through-holes 38A from above, and the outer circumferential edge portion of the lower face of the bus bars 31 abuts against the stepped portions 38B, whereby the bus bars 31 are held by the bus bar holding portions 38.

In this regard, as shown in FIG. 4, the bus bar holding portions 38 and the temperature electric wire wiring groove 39 described next are separated by a wall 41, and in the bus bar holding portions 38 that hold the bus bars 31 configured to fix the temperature detection portion 32, the wall 41 is cut out corresponding to the width of the narrow portion 32E of the temperature detection portion 32. As shown in FIG. 1, the narrow portion 32E fits into the cut-out of the temperature detection portion 32, whereby movement in the front-rear direction with respect to the insulating protector 34 is restricted.

As shown in FIG. 4, the temperature wire wiring groove 39 is provided outside of one bus bar holding portion 38 (the bus bar holding portion 38 on the right side in FIG. 4) among the left and right bus bar holding portions 38. The temperature wire wiring groove 39 is a groove for wiring the electric wires W2 extending from the temperature detection portion 32 in the longitudinal direction of the main body portion 35. The temperature wire wiring groove 39 is an example of "a groove crossing between the holding portion and the temporary locking portion".

Figure 8:
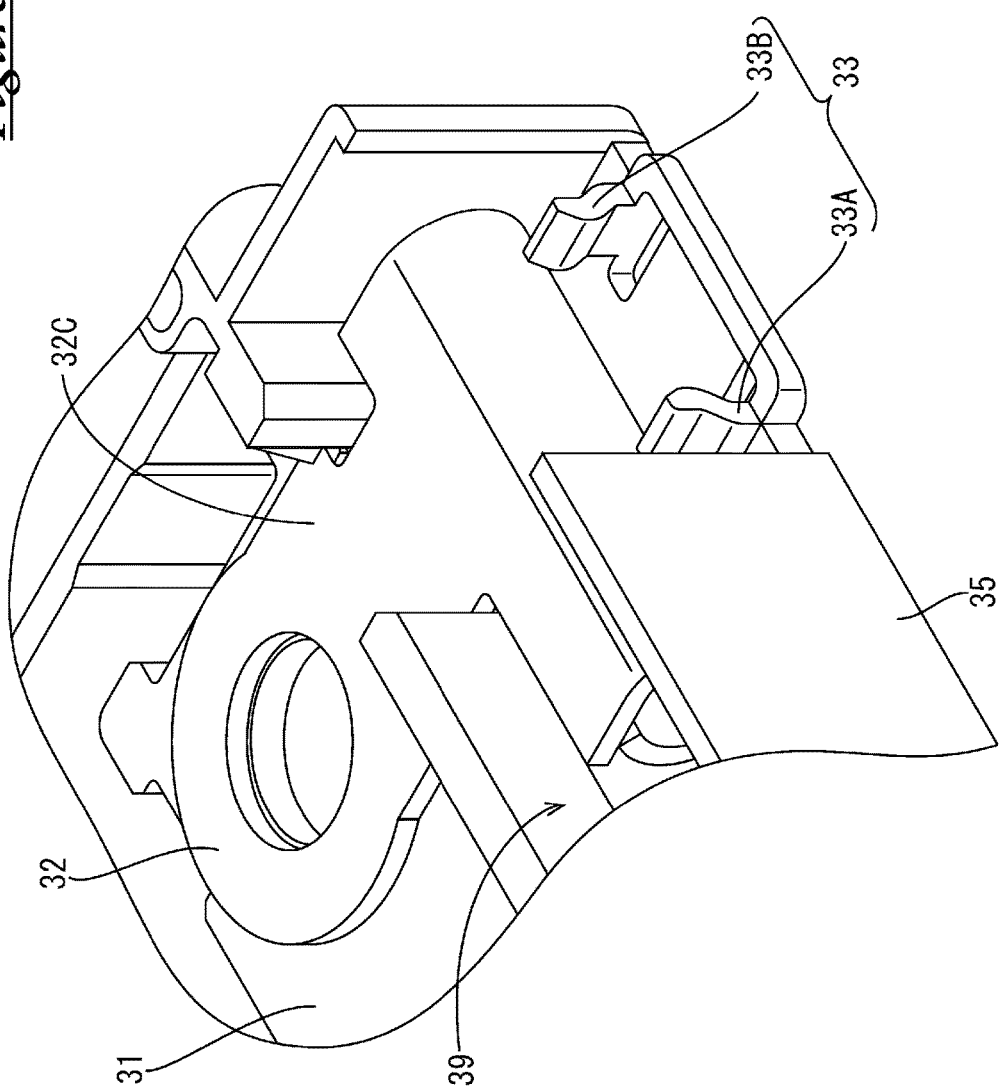
FIG. 8 is a perspective view showing the vicinity of the temporary locking portion of an insulating protector (showing a state in which the temperature detection portion is fixed to the electrode terminals).

The temporary locking portion 33 is provided on a bottom wall of the temperature wire wiring groove 39. Specifically, as shown in FIG. 8, the temporary locking portion 33 is formed at a position corresponding to the above-described cut-out in the bottom wall of the temperature wire wiring groove 39. The temporary locking portion 33 has two elastically deformable arm portions 33A and 33B that rise upward from the bottom wall of the temperature wire wiring groove 39. Each of the arm portions 33A and 33B is curved so as to protrude toward the respective other arm portion 33. Also, the wall outside of the temperature wire wiring groove 39 is cut out at a position corresponding to the temporary locking portion 33.

Figure 9:
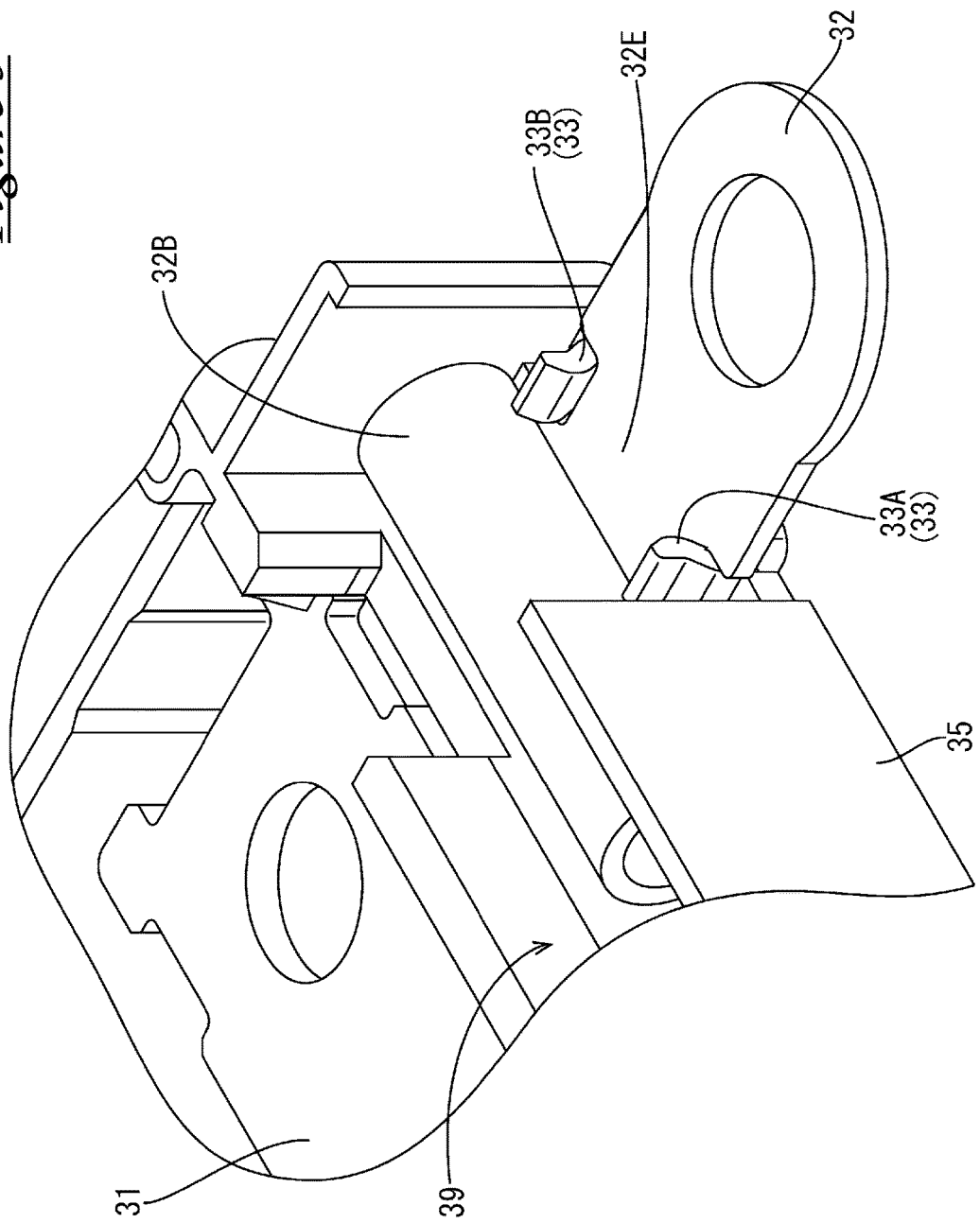
FIG. 9 is a perspective view showing the vicinity of the temporary locking portion of the insulating protector (showing a state in which the temperature detection portion is temporarily locked).

Next, the temperature detection portion 32 locked to the temporary locking portion 33 will be described with reference to FIG. 9. In the temperature detection portion 32, the narrow portion 32E is sandwiched between the two arm portions 33A and 33B, and thus the temperature detection portion 32 is locked to the temporary locking portion 33. When the temperature detection portion 32 is locked to the temporary locking portion 33, the rotary shaft 32B of the temperature detection portion 32 is accommodated in the temperature wire wiring groove 39 in an attitude such that the axis line of the rotary shaft 32B extends in the longitudinal direction of the temperature wire wiring groove 39.

When the temperature detecting portion 32 is locked to the temporary locking portion 33, the temperature detection portion 32 is not positioned above the bus bar holding portions 38. Therefore, when causing the bus bar holding portions 38 to hold the bus bars 31, the temperature detection portion 32 does not interfere with the bus bars 31. That is, the temporary locking portion 33 locks the temperature detection portion 32 at a position that does not interfere with the bus bars 31 when a worker causes the bus bar holding portions 38 to hold the bus bars 31.

Next, fixing of the temperature detection portion 32 will be described with reference to FIG. 9. A worker of the vehicle manufacturer causes the bus bar holding portions 38 of the connection module 1 to hold the bus bars 31, and places the connection module 1 holding the bus bars 31 on the plurality of battery packs 2. Then, before fixing the bus bars 31 to the electrode terminals 22 with bolts, the worker releases locking of the temperature detection portion 32 by the temporary locking portion 33, and arranges the temperature detection portion 32 on the bus bars 31.

Specifically, the worker releases locking of the temperature detection portion 32 by the temporary locking portion 33 by rotating the temperature detection portion 32 around the rotary shaft 32B. Then, by the worker further rotating the temperature detection portion 32, which is unlocked, around the rotary shaft 32B (around the center of the rotary shaft 32B), the flat plate portion 32C of the temperature detection portion 32 is arranged on the bus bars 31 as shown in FIG. 8.

In this regard, in the temperature detection portion 32, since the rotary shaft 32B is accommodated in the temperature wire wiring groove 39, when the worker rotates the temperature detection portion 32, the temperature detection portion 32 is suppressed from moving in a direction perpendicular to the axis line of the rotary shaft 32B by the temperature wire wiring groove 39. In other words, the work of the worker rotating the temperature detection portion 32 is assisted by the temperature wire wiring groove 39.

Then, the worker fastens the temperature detection portion 32 and the bus bars 31 to the electrode terminals 22 with bolts. Thus, the temperature detection portion 32 is fixed on the bus bars 31.

According to the connection module 1 described above, the insulating protector 34 has the temporary locking portions 33 that detachably lock the temperature detection portion 32. In a case where the connection module 1 is delivered to the vehicle manufacturer in a state in which the temperature detection portion 32 is not fixed to the bus bars 31 or the insulating protector 34, when a worker of the vehicle manufacturer performs work of fixing the temperature detection portion 32 on the bus bars 31 being held by the insulating protector 34, if the temperature detection portion 32 is at a position distant from the insulating protector 34, the distance of hand motion becomes long, and therefore work efficiency is reduced. According to the connection module 1, if the manufacturer of the connection module 1 delivers the connection module 1 in a state with the temperature detection portion 32 locked to the temporary locking portion 33, the temperature detection portion 32 is near the insulating protector 34, so a worker of the vehicle manufacturer can efficiently perform work of fixing the temperature detection portion 32 on the bus bars 31.

Furthermore, according to the connection module 1, when the worker causes the bus bar holding portions 38 to hold the bus bars 31, the locked temperature detection portion 32 does not interfere with the bus bars 31, so in comparison to a case where the temperature detection portion 32 is locked at a position that interferes with the bus bars 31, it is possible to more efficiently perform the work of causing the bus bar holding portions 38 to hold the bus bars 31.

Furthermore, according to the connection module 1, by hand movement in one direction that rotates the temperature detection portion 32 around the rotary shaft 32B, the worker can perform both work to release the temperature detection portion 32 from the temporary locking portion 33 and work to place the temperature detection portion 32 on the bus bars 31. Therefore, it is possible to more efficiently perform the two forms of work than in a case where the worker must move their hand in two or more directions, such as a case where the worker releases locking of the temperature detection portion 32 by moving their hand in a certain direction, and moves the temperature detection portion 32 released from locking in another direction to place the temperature detection portion 32 on the bus bars 31.

Furthermore, according to the connection module 1, since the work of rotating the temperature detection portion 32 is assisted by the temperature wire wiring groove 39, the worker can easily perform the work of rotating the temperature detection portion 32.

Furthermore, according to the connection module 1, since the temperature wire wiring groove 39 for wiring the wires W2 can be used also as a groove that assists rotation of the temperature detection portion 32, the configuration can be simplified in comparison to a case where a groove that assists rotation of the temperature detection portion 32 is separately provided.

Other Embodiments

The present invention is not limited to the embodiment explained by the above description and the drawings, and for example, the following sort of embodiments are also included in the technical scope of the present invention.

In the above embodiment, an exemplary case was described in which the temperature detection portion 32 is configured to be locked at a position that does not interfere with the bus bars 31 when the bus bar holding portions 38 are caused to hold the bus bars 31. However, the temperature detection portion 32 may also be locked at a position that interferes with the bus bars 31. In this case, the worker may remove the temperature detection portion 32 from the temporary locking portion 33 before causing the bus bars 31 to be held.

In the above embodiment, an exemplary case was described in which the temperature detection portion 32 has the rotary shaft 32B. However, the temperature detection portion 32 does not need to have the rotary shaft 32B. The reason for this is that even if the rotary shaft 32B is not provided, the worker can perform the two forms of work by moving their hand in one direction if their hand is moved in the same manner as in the case where the rotary shaft 32B is provided. However, in order to facilitate the rotation work, it is preferable that the rotary shaft 32B is provided.

Also, in a case where the temperature detection portion 32 does not have the rotary shaft 32B, the position where the temperature detection portion 32 is to be locked does not necessarily need to be a position where the worker can perform the above-described two forms of work by hand movement in one direction. For example, the temperature detection portion 32 may also be locked at a position where it is necessary for the worker to move their hand in two or more directions, such as a case where the worker releases locking of the temperature detection portion 32 by moving their hand in a certain direction, and moves the temperature detection portion 32 released from locking in another direction to place the temperature detection portion 32 on the bus bars 31.

In the above embodiment, an exemplary case was described in which the rotary shaft 32B is accommodated in the temperature wire wiring groove 39 where the wires W2 are wired. However, in the insulating protector 34, a dedicated groove where the rotary shaft 32B is accommodated may be provided separately from the temperature wire wiring groove 39.

In the above embodiment, an example was described in which the connection module 1 connects a plurality of the battery packs 2 in series, but a configuration may also be adopted in which the connection module 1 connects a plurality of the battery packs 2 in parallel.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

1 Connection module
2 Battery pack
11 Module side connector
21 Single battery side connector
22 Electrode terminal
31 Bus bar (conductor)
31A Bolt through-hole
32 Temperature detection portion
32B Rotary shaft
33 Temporary locking portion
35 Main body portion (insulating member)
38 Bus bar holding portion
39 Temperature wire wiring groove (groove)
W2 Wire

The invention claimed is:

1. A connection module configured to connect a plurality of electric storage elements having positive and negative electrode terminals, the connection module comprising:
   an insulating member having a holding portion that holds a conductor configured to connect the electrode terminals of adjacent electric storage elements; and
   a temperature detection portion that detects the temperature of the conductor;
   wherein the insulating member has a temporary locking portion that detachably locks the temperature detection portion at a position where the temperature detection portion does not interfere with the conductor when the conductor is held by the holding portion, and
   wherein the temperature detection portion has a rotary shaft, and when the temperature detection portion locked to the temporary locking portion rotates around the rotary shaft, locking is released, and when the temperature detection portion with locking released further rotates around the rotary shaft, the temperature detection portion abuts against the conductor.

2. The connection module according to claim 1,
   wherein a groove crossing between the holding portion and the temporary locking portion is provided in the insulating member, and
   when the temperature detection portion is locked to the temporary locking portion, the rotary shaft is accommodated in the groove in an attitude such that an axis line of the rotary shaft extends in a longitudinal direction of the groove.

3. The connection module according to claim 2,
   wherein the temperature detection portion includes a temperature detection element and a wire connected to the temperature detection element, and the groove is a groove where the wire is wired.

4. A connection module to be attached to an electric storage element group in which a plurality of storage elements having positive and negative electrode terminals are arranged, the connection module comprising:
   a conductor configured to electrically connect the electrode terminals of adjacent electric storage elements;
   an insulating member having a holding portion that holds the conductor; and
   a temperature detection portion that detects the temperature of the conductor;
   wherein the insulating member has a temporary locking portion that detachably locks the temperature detection portion at a position where the temperature detection portion does not interfere with the conductor when the conductor is held by the holding portion, and
   wherein the temperature detection portion has a rotary shaft, and when the temperature detection portion locked to the temporary locking portion rotates around the rotary shaft, locking is released, and when the temperature detection portion with locking released further rotates around the rotary shaft, the temperature detection portion abuts against the conductor.

* * * * *